United States Patent Office

2,809,992
Patented Oct. 15, 1957

2,809,992

PROCESS FOR MAKING ALPHA,ALPHA-DIHALOPROPIONIC ACIDS

Harry F. Brust and Herman O. Senkbeil, Midland, Mich., assignors to The Dow Chemical Company, Midland, Mich., a corporation of Delaware No Drawing. Application October 15, 1953,
Serial No. 386,394

11 Claims.  (Cl. 260—539)

This invention concerns an improved process for making alpha, alpha-dihalopropionic acids. It relates more particularly to a procedure and catalysts for halogenating an alpha-halo-propionic acid to form a corresponding alpha, alpha-dihalopropionic acid.

Bass, in U. S. Patent No. 2,010,685, describes a procedure and catalysts for chlorinating propionic acid at temperatures of from 50° to 140° C. to form the alpha-chloro derivative thereof as substantially the sole monochlorinated product while at the same time the yields of higher polychlorinated by-products are materially reduced below that obtained by chlorinating said acid in the absence of a catalyst. It is taught that both under-chlorination and over-chlorination should be avoided, since both the unreacted acid and the polychloro derivatives thereof can be separated from the alpha-chloro product only with difficulty.

The method heretofore proposed for chlorinating propionic acid to obtain alpha-chloropropionic acid cannot satisfactorily be applied in continuing the chlorination to produce alpha,alpha-dichloropropionic acid. The chlorination of alpha-chloropropionic acid is sluggish at temperatures of from 50° to 140° C., and usually results in the formation of a mixture of poly-chloro derivatives, including both alpha,alpha-dichloropropionic acid and alpha,beta-dichloropropionic acid, together with substantial amounts of higher poly-chloro derivatives such as alpha,alpha,beta-trichloropropionic acid, or in incomplete chlorination of the alpha-chloropropionic acid starting material. In either such instance, the alpha,alpha-dichloropropionic acid product can be separated only with difficulty.

It is a primary object of the invention to provide an improved method for making an alpha,alpha-dihalopropionic acid. Another object is to provide a procedure and catalysts for carrying out the reaction of chlorine or bromine with an alpha-halopropionic acid to obtain a corresponding alpha,alpha-dihalopropionic acid in a form free, or nearly free, of other poly-halo derivatives. A specific object is to provide an improved method for making alpha,alpha-dichloropropionic acid by reaction of chlorine with alpha-chloropropionic acid. Other and related objects may appear from the following description of the invention.

According to the invention an alpha-alpha-dihalopropionic acid can readily be obtained by reacting a halogen such as chlorine or bromine with an alpha-halopropionic acid at elevated temperatures in the presence of a phosphorus-containing catalyst.

It is important that the halogenating reaction be carried out at a temperature of at least 150° C. and in the presence of a phosphorus-containing catalyst in order to obtain a corresponding alpha,alpha-dihalopropionic acid in a form free, or nearly free, of other poly-halo derivatives and as the principal product.

The alpha-halopropionic acids to be employed are alpha-chloropropionic acid and alpha-bromopropionic acid. The alpha-halopropionic acids may be prepared in accordance with the procedure described in the aforementioned U. S. Patent No. 2,010,685.

The halogen can be chlorine or bromine. The halogen is usually employed in amount corresponding to approximately one molecular proportion of the chlorine or bromine per mole of the alpha-halopropionic acid starting material. The halogen is usually fed to a mixture of the liquid alpha-halopropionic acid and catalyst at a rate not substantially greater than the rate at which it is consumed in the reaction, and in amount corresponding to from 1 to 1.2 moles of the halogen per mole of the alpha-halopropionic acid employed. Best results are usually obtained when the chlorine, or bromine, is fed to the reaction at a rate not exceeding that at which it is consumed in the reaction, and in amount corresponding to one molecular proportion of the halogen per molecular equivalent proportion of the alpha-halopropionic acid.

The phosphorus-containing catalyst can be phosphorus, or a halide, oxyhalide, oxygen acid, or oxide, of the element phosphorus. Examples of suitable phosphorus-containing catalysts are phosphorus, phosphorus trioxide, phosphorus pentoxide, phosphorus trichloride, phosphorus tribromide, phosphorus pentachloride, phosphorus pentabromide, phosphorus oxychloride, phosphorus oxybromide, phosphorous acid, phosphoric acid, or mixtures of any two or more of such compounds.

The phosphorus-containing compounds are herein referred to as catalysts, since they are added for purpose of obtaining a catalytic effect and are necessary in the reaction. It is probable that the true catalyst for the reaction is a phosphorus-containing intermediate or complex of unknown composition, e. g. a complex of the phosphorus compound and an acyl halide of the alpha-halopropionic acid, formed in situ.

The phosphorus compound or catalyst is usually employed in amount corresponding to from 1 to 20, preferably from 3 to 7 percent by weight of the alpha-halopropionic acid starting material.

The halogenating reaction can readily be carried out at temperatures between 150° and 225° C., preferably from 155° to 185° C., and at atmospheric pressure or thereabout, or at superatmospheric pressures, e. g. of from 5 to 30 pounds per square inch gauge such as to maintain the main body of the alpha-halopropionic acid in liquid condition.

In practice, an alpha-halopropionic acid, e. g. alpha-chloropropionic acid, is placed in a reaction vessel, together with all, or a portion of, a desired amount of a phosphorus-containing catalyst. The mixture is stirred and heated to a reaction temperature within the above-stated range. The halogen, i. e. chlorine or bromine, is introduced into the liquid wherein it is dispersed. It reacts and forms a corresponding hydrohalic acid. The halogen is usually added at about the rate at which it is consumed in the reaction. The hydrohalic acid is vented from the reaction zone as it is formed. Feed of the halogen and reaction of the same is continued until an amount corresponding to approximately 1, usually from 1 to 1.2, moles of the halogen per mole of the alpha-halopropionic acid starting material has been consumed in the reaction. A further amount of a phosphorus-containing catalyst may be added during the reaction if the latter tends to become sluggish. Satisfactory results have been obtained by adding a portion of the desired amount of catalyst prior to adding the halogen and adding further portions of the catalyst at intervals during the reaction.

Upon completion of the halogenation reaction the crude product is usually separated from the catalyst residue and is mixed with water in amount sufficient to react with the small proportions of acyl halides and anhydrides formed in the reaction and hydrolyze the same to the corresponding acids. Hydrolysis of the acyl halides and anhydrides can be effected by adding the required amount of water to the crude reaction mixture containing the catalyst, and thereafter separating the product from the catalyst residue.

In an alternate procedure, propionic acid can be halogenated, e. g. by reaction of chlorine with the same in accordance with the procedure described in the aforementioned U. S. Patent No. 2,010,685, employing a phosphorus-containing catalyst, to form a corresponding alpha-halopropionic acid as the principal product. The crude reaction mixture can be employed as the starting material and reacted with a further amount of chlorine or bromine at temperatures within the range of from 150° to 225° C. to form a corresponding alpha,alpha-dihalopropionic acid as hereindescribed.

The following examples illustrate ways in which the principle of the invention has been applied, but are not to be considered as limiting its scope.

*Example 1*

A charge of 22 pounds of a batch of alpha-chloropropionic acid, together with 0.66 pound of phosphorus trichloride as catalyst, was placed in a glass reaction vessel equipped with a reflux condenser and stirrer. The alpha-chloropropionic acid employed in the experiment was prepared by chlorinating propionic acid at a temperature of from 115° to 120° C. in the presence of 3 percent by weight of phosphorus trichloride as catalyst until approximately one molecular proportion of chlorine per molecular equivalent proportion of the propionic acid initially used was consumed in the reaction. The alpha-chloropropionic acid starting material contained 97.5 percent by weight of alpha-chloropropionic acid and 2.5 percent of alpha,alpha-dichloropropionic acid. The mixture of alpha-chloropropionic acid and catalyst was stirred and heated to a temperature of 130° C. Chlorine was introduced into the liquid at a rate of approximately 0.12 pound of the chlorine per hour. After 2.5 pounds of chlorine was added, the temperature of the mixture was raised to 150° C. Chlorination was continued with stirring and heating of the mixture at a temperature between 150° and 160° C. for a period of 68.5 hours while adding 9.1 pounds of chlorine. Hydrogen chloride formed in the reaction, together with unreacted chlorine, was vented through the reflux condenser. A charge of 0.29 pound of phosphorus trichloride was added to the mixture and the chlorination continued for a period of 91 hours longer while adding 7.9 pounds of chlorine. Total chlorine fed to the reaction was 19.5 pounds. Unreacted chlorine vented from the reaction was 2.14 pounds. The total reaction time was 176.5 hours. The mixture was cooled. The liquid product was separated from the catalyst residue. The crude product weighed 27.5 pounds. The catalyst residue weighed one pound. The liquid product had a density of 1.4380 at 25° C. The quantities of acyl chlorides present in the crude product were determined by hydrolyzing an aliquot portion of the same with water and titrating the hydrochloric acid with silver nitrate. The quantity of water theoretically required to hydrolyze the acyl chlorides present in the crude product was then added to the main body of said product and the latter was distilled. There were obtained 0.89 pound of a forefraction boiling at temperatures of from 45° at 168 millimeters absolute pressure to 111° C. at 42 millimeters pressure, 25.28 pounds of alpha,alpha-dichloropropionic acid product boiling at temperatures of from 93° C. at 12 millimeters absolute pressure to 126.5° C. at 8 millimeters pressure, and 1.2 pounds of tar-like residue. The distilled product was analyzed and found to consist of 2 percent by weight of alpha-chloropropionic acid, 87 percent alpha,alpha-dichloropropionic acid, 6 percent alpha,alpha-dichloropropionic anhydride, 4 percent alpha,alpha,beta-trichloropropionic acid and 1 percent unknown material. No alpha,beta-dichloropropionic acid was obtained.

*Example 2*

A charge of 542.5 grams of the batch of the alpha-chloropropionic acid described in Example 1, together with 16.5 grams of phosphorus trichloride was placed in a glass reaction flask equipped with a reflux condenser and stirrer. The mixture was stirred and heated to a temperature of 175° C. Chlorine was added at a rate of approximately 13 grams per hour while stirring and heating the mixture at a temperature between 175° and 180° C. Hydrogen chloride and unreacted chlorine were vented through the condenser. After 17 hours, 5.5 grams of phosphorus trichloride was added and the chlorination continued. Five hours later another 5.5 grams of phosphorus trichloride was added and the chlorination continued. Five hours later another 5.5 grams of phosphorus trichloride was added and the chlorination continued for 10 hours longer. The total chlorination time was 32 hours. A total of 420 grams of chlorine was fed to the reaction. The mixture was cooled to room temperature and the liquid separated from the catalyst residue by decanting. There was obtained 667 grams of crude product. Twelve cubic centimeters of water was added to hydrolyze acyl chlorides and anhydrides in crude product. Thereafter, the mixture was distilled. There was obtained 632 grams of distillate boiling at temperatures of from 37° C. at 23 millimeters absolute pressure to 77° C. at 0.7 millimeter pressure. It was analyzed and found to contain 97 percent by weight of alpha,alpha-dichloropropionic acid, 2 percent alpha,alpha-beta-trichloropropionic acid and 1 percent alpha-chloropropionic acid. The yield of said product was 88.5 percent. No alpha,beta-dichloropropionic acid was obtained.

*Example 3*

A charge of 542.5 grams of the batch of the alpha-chloropropionic acid described in Example 1, together with 27 grams of phosphorus acid ($H_3PO_3$) as catalyst was placed in a glass reaction vessel and chlorinated by procedure similar to that described in Example 2. A total of 500 grams of chlorine was fed to the reaction at a temperature of 175° to 180° C. over a period of 53 hours. Unreacted chlorine and HCl were vented through the reflux condenser. The mixture was cooled to room temperature and the liquid product separated from the catalyst residue. Twelve grams of water was added to the liquid product, after which it was distilled. There were obtained 571 grams of liquid product as distillate boiling at temperatures of from 56° C. at 2 millimeters absolute pressure to 110° C. at 3 millimeters and 32 grams of residue. The product was analyzed and found to contain 95 percent by weight of alpha,alpha-dichloropropionic acid, 2 percent unknown and 3 percent alpha-chloropropionic acid. No alpha-beta-dichloropropionic acid was obtained.

*Example 4*

A charge of 542.5 grams of the batch of the alpha-chloropropionic acid described in Example 1, together with 16 grams of phosphorus pentoxide as catalyst was placed in a glass reaction flask equipped with a reflux condenser and stirrer. The mixture was stirred and heated at a temperature of from 175° to 180° C. Chlorine was introduced at a rate of approximately 7 grams per hour over a period of 58.5 hours. HCl and unreacted chlorine were vented through the reflux condenser. A total of 426 grams of chlorine was fed to the reaction. The mixture was cooled, and the liquid product separated from the catalyst residue. 3.5 cc. of water was added to the product, after which it was distilled. There were obtained 594 grams of liquid product as distillate boiling at temperatures of from 72° C. at 7 millimeters absolute pressure to 83.5° C. at 1 millimeter pressure and 30 grams of residue. The product was analyzed and found to contain 6 percent by weight of alpha-chloropropionic acid, 83 percent of alpha,alpha-dichloropropionic acid, 4 percent of alpha,alpha-dichloropropionic anhydride, 2 percent of alpha,alpha,beta-trichloropropionic acid and 5 percent unknown. No alpha,beta-dichloropropionic acid was obtained.

*Example 5*

A charge of 542.5 grams of the batch of the alpha-chloropropionic acid described in Example 1, together with 27 grams of phosphorus pentachloride as catalyst, was placed in a glass reaction flask equipped with a reflux condenser and stirrer and chlorinated by introducing chlorine into the stirred and heated mixture at a temperature of from 175° to 180° C. over a period of 50 hours. HCl and unreacted chlorine were vented through the reflux condenser. A total of 440 grams of chlorine was fed to the reaction. The mixture was cooled and the liquid product decanted from the catalyst residue. 4.5 cc. of water was added to the liquid product, after which it was distilled. There were obtained 617 grams of liquid product as distillate boiling at temperatures of from 70° C. at 10 millimeters absolute pressure to 89° C. at 0.5 millimeter pressure and 25 grams of residue. The product was analyzed and found to contain 1 percent by weight of alpha-chloropropionic acid, 90 percent alpha,alpha-dichloropropionic acid, 3 percent alpha,alpha-dichloropropionic anhydride, 5 percent alpha,alpha-beta-trichloropropionic acid and 1 percent unknown. No alpha,beta-dichloropropionic acid was obtained.

*Example 6*

A charge of 612 grams of alpha-bromopropionic acid, together with 36.6 grams of phosphorus tribromide as catalyst was placed in a glass reaction flask equipped with a reflux condenser and stirrer. The mixture was stirred and heated at a temperature between 175° and 180° C. Bromine was added at a rate of approximately 40 grams of bromine per hour over a period of 15.5 hours. A total of 640 grams of bromine was fed to the reaction. Hydrogen bromide formed in the reaction was vented through the reflux condenser. The mixture was cooled and the liquid poured from the reaction vessel. There were obtained 863 grams of liquid product and 15 grams of solid catalyst residue. Seven cubic centimeters of water was added to the crude liquid product with stirring, after which it was distilled. There were obtained 216 grams of a fore-fraction boiling at a temperature of from 30° C. at 10 millimeters absolute pressure to 106° C. at 7 millimeters pressure, 549 grams of alpha,alpha-dibromopropionic acid boiling at 106°–107° C. at 7 millimeters pressure and 105 grams of residue. The alpha,alpha-dibromopropionic acid product was analyzed and found to contain 68.6 percent by weight of bromine.

*Example 7*

A charge of 4500 pounds of propionic acid, together with 190 pounds of phosphorus trichloride as catalyst, was stirred and heated at a temperature between 120° and 125° C. while feeding 4800 pounds of chlorine into the liquid over a period of 32.5 hours. Hydrogen chloride formed in the reaction and unreacted chlorine were vented from the reaction. An aliquot portion of the reaction product was withdrawn and analyzed. It was found to contain 98 percent by weight of alph-chloro-propionic acid and 2 percent of alpha,alpha-dichloropropionic acid. Another portion of 75 pounds of phosphorus trichloride as catalyst was added to the main body of the reaction mixture. The chlorination was continued by feeding chlorine to the mixture while raising the temperature from 125° C. to 176° C. over a period of 7 hours. Thereafter, chlorine was fed to the mixture at a temperature between 176° and 180° C. over a period of 20 hours. Another portion of 25 pounds of the phosphorus trichloride catalyst was added and the chlorination continued for 25 hours longer. The total reaction time was 84.5 hours. The reacted mixture was cooled to 90° C. and 65 pounds of water added with stirring. The mixture was cooled to room temperature. The liquid product was separated from the catalyst residue. An aliquot portion of the liquid product was withdrawn and analyzed. It was found to contain 10 percent by weight of alpha-chloropropionic acid, 88 percent of alpha,alpha-dichloropropionic acid, 1 percent of alpha,alpha-dichloropropionic acid anhydride and 1 percent alpha,alpha,beta-trichloropropionic acid.

In place of the alpha-bromopropionic acid employed in Example 6, alpha-chloropropionic acid can be used and brominated to form the corresponding alpha-chloro-alpha-bromopropionic acid. In place of the chlorine employed in the Examples 1–5, bromine can be employed in molecular equivalent proportions to form the corresponding alpha-chloro-alpha-bromopropionic acid.

We claim:

1. A process for making an alpha,alpha-dihalopropionic acid which comprises reacting an alpha-halopropionic acid, which is a member of the group consisting of alpha-chloropropionic acid and alpha-bromopropionic acid, with an approximately equimolecular proportion of a halogen selected from the class consisting of chlorine and bromine at a temperature between 150° and 225° C. in the presence of from 1 to 7 percent by weight of a phosphorus-containing catalyst selected from the group consisting of phosphorus and the halides, oxyhalides, oxygen acids and oxides of the element phosphorus while feeding the halogen into admixture with the liquid alpha-halopropionic acid at about the rate it is consumed in the reaction.

2. A process as claimed in claim 1, wherein the halogen is chlorine.

3. A process as claimed in claim 1, wherein the halogen is bromine.

4. A process as claimed in claim 1, wherein the phosphorus-containing catalyst is phosphorus trichloride.

5. A process for making alpha,alpha-dichloropropionic acid which comprises reacting alpha-chloropropionic acid with an approximately molecular equivalent proportion of chlorine at a reaction temperature between 150° and 225° C. in the presence of from 1 to 7 percent by weight of a phosphorus-containing catalyst selected from the group consisting of phosphorus and the halides, oxyhalides, oxygen acids and oxides of the element phosphorus while feeding the chlorine into admixture with the liquid alpha-chloropropionic at about the rate it is consumed in the reaction.

6. A process as claimed in claim 5, wherein the phosphorus-containing catalyst is phosphorus trichloride.

7. A process as claimed in claim 5, wherein the phosphorus-containing catalyst is phosphorus pentaoxide.

8. A process as claimed in claim 5, wherein the phosphorus-containing catalyst is phosphorus acid.

9. A process as claimed in claim 5, wherein the phosphorus-containing catalyst is phosphorus pentachloride.

10. A process for making alpha,alpha-dibromopropionic acid which comprises reacting alpha-bromopropionic acid with an approximately equimolecular proportion of bromine at a temperature between 150° and 225° C. in the presence of from 1 to 7 percent by weight of a phosphorus-containing catalyst selected from the group consisting of phosphorus and the halides, oxyhalides, oxygen acids and oxides of the element phosphorus while feeding the bromine into admixture with the liquid alpha-bromopropionic acid at about the rate it is consumed in the reaction.

11. A process as claimed in claim 10, wherein the phosphorus-containing catalyst is phosphorus tribromide.

References Cited in the file of this patent

UNITED STATES PATENTS

| | | |
|---|---|---|
| 1,921,717 | Amstutz | Aug. 8, 1933 |
| 2,010,685 | Bass | Aug. 6, 1935 |

OTHER REFERENCES

Richter: "Organic Chemistry," published by J. Wiley & Sons, Inc., N. Y. (1938), p. 307.